E. SCHENK.
WEIGHING APPARATUS.
APPLICATION FILED JAN. 24, 1916.

1,232,983.

Patented July 10, 1917.

Witnesses:
J. H. Fisher.
Jessie L. Schenk.

Inventor:
Eduard Schenk.
By Bryan D. Pinkney,
Attorney.

UNITED STATES PATENT OFFICE.

EDUARD SCHENK, OF NEWPORT, KENTUCKY.

WEIGHING APPARATUS.

1,232,983.  Specification of Letters Patent.  Patented July 10, 1917.

Application filed January 24, 1916. Serial No. 74,065.

*To all whom it may concern:*

Be it known that I, EDUARD SCHENK, a citizen of the United States, residing at Newport, in the county of Campbell and State of Kentucky, have invented a new and useful Weighing Apparatus, of which the following is a specification.

My invention relates to improvements in an apparatus for weighing loads and registering same on a scale member by means of the pressure exerted by said loads through the medium of a non-compressible fluid in fluid-pressure chambers; and the object of my invention is to provide a weighing apparatus that will have the necessary elasticity to permit the weighing and registering of a load, without the objectionable jumping noticeable in the scales composed of levers that are of the knife-edged trunnion type now commonly used.

One of the objects of my invention is to provide a means for weighing a load and registering said load, and at the same time eliminate all articulating levers connected with the weighing platform on which the load is placed. As the scales commonly now are, when the load comes on, particularly in the case of a railroad car, one end of the weighing platform has a tendency to jump up. This disarranges the knife edges of the balancing trunnions and affects the accuracy of the weighing apparatus.

A further object of my invention is to provide a steady platform connected with the weighing apparatus by eliminating the complex system of leverage or so-called compound leverage as commonly used, which causes the fluctuations of the weighing apparatus platform, and the load cannot accurately be weighed until these fluctuations, or as they are called, bobbings have ceased.

To the accomplishment of the above and related ends, said invention, then, consists of the means hereinafter fully described and particularly pointed out in the claim.

The annexed drawing and the following description set forth in detail certain mechanism embodying the invention, such disclosed means constituting, however, but one of the various mechanical forms in which the principle of the invention may be used.

Figure 1:
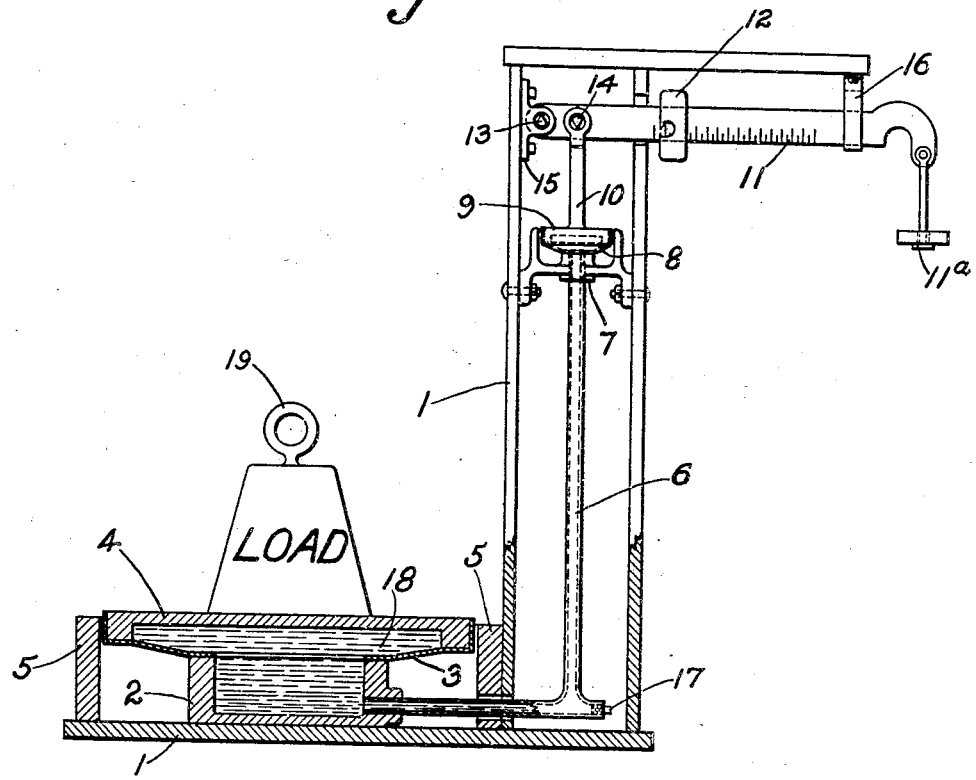
Figure 2:
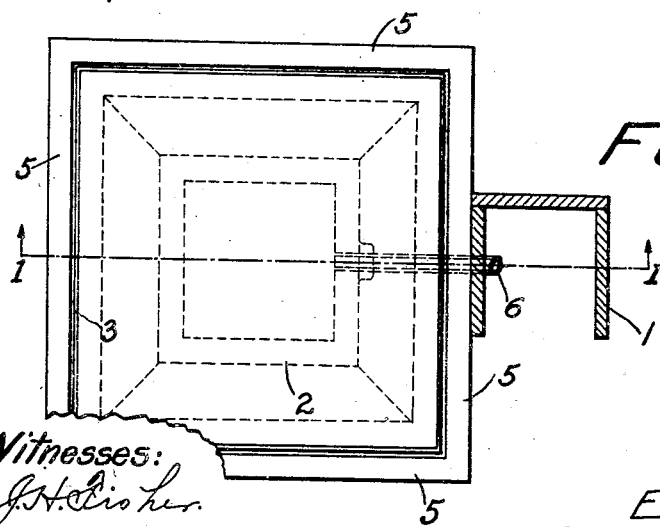

In said drawing, Figure 1 illustrates the principle of my invention; Fig. 2, a plan view of receptacle 2, flexible member 3, platform 4, and guides 5, 5, 5, 5. Fig. 1 is partially cross-sectioned conforming to line 1—1 at Fig. 2.

Similar numerals refer to similar parts throughout the several figures.

Referring to the drawing, the frame 1 supports the receptacle 2, which is provided with a flexible member 3, provided with a platform 4, and guides 5, 5. Channel or tube 6 connects with a receptacle 7, a flexible member 8, and a plate 9, the upper part of which connects with a scale plunger 10, pivotally connecting with scale-beam 11, generally provided with attachment 11$^a$ for the purpose of additional counterweights, and runner 12, for directly reading or scaling the load 19, scale-beam 11 being articulated by knife-edged pivots 13, 14, and pivot bracket 15, the travel of said scale-beam usually being limited by means of a bracket 16. An aperture 17, ordinarily sealed, is provided that fluid may be added or withdrawn as necessity may arise, as all joints of my weighing apparatus are hermetically sealed. Fluid 18 fills all space in receptacle 2, flexible member 3, channel 6, receptacle 7, and flexible member 8.

The receptacle 2, flexible member 3, and platform 4, comprise the fluid-pressure chamber for receiving the load; receptacle 7, flexible member 8, plate 9, and scale plunger 10, comprise the fluid-pressure chamber for registering said load; the channel 6 comprises the means for transmitting the fluid pressure from one fluid-pressure chamber to the other; and the pressure exerted to the fluid due to the superimposed load is the agency for transmitting the fluid pressure from one fluid-pressure chamber to the other, for the purpose of registering said load.

The operation of my weighing apparatus is as follows:—The load 19 is applied to the platform 4, which is of such an area that the pressure exerted to flexible member 3, and fluid 18, does not exceed a reasonable pressure per square inch. This pressure, on account of the free yielding nature of non-compressible fluids, is transmitted to the receptacle 7, flexible member 8, plate 9, and scale plunger 10, by means of channel 6, and is here counteracted upon by scale-member parts 11, 11$^a$, 12, 13, 14, through the means of said scale plunger 10, the said load 19 on platform 4 being registered through the leverage means of said scale-member parts that said load may be read on scale-beam 11.

Other modes of applying the principle of my invention may be employed instead of the one explained, change being made as regards the arrangement of the chambers herein disclosed, provided the means stated by the following claim or the equivalent of such stated means be employed.

Having described my invention, what I claim as new and desire to secure by Letters Patent, is—

In a fluid-operated weighing apparatus, the combination comprising a receiving-chamber consisting of an upper part and a lower part of less area with a flat flexible member interposed, a registering-chamber of smaller area than said receiving-chamber and consisting of an upper part and a lower part of less area with a flat flexible member interposed and provided at the upper part with a compression member to connect said registering-chamber with a scale, and a connecting channel-pipe for the transmission of the static fluid pressure in said chambers, for the purpose of registering the load, substantially as described.

In testimony whereof I have hereunto set my hand in presence of two subscribing witnesses.

EDUARD SCHENK.

Witnesses:
B. D. PINKNEY,
J. H. FISHER.